United States Patent [19]

Okerblom

[11] 4,194,722

[45] Mar. 25, 1980

[54] BUTTERFLY VALVE HAVING HIGH PERFORMANCE DISC

[75] Inventor: Charles L. Okerblom, Warwick, R.I.

[73] Assignee: International Telephone and Telegraph Corporation, New York, N.Y.

[21] Appl. No.: 840,867

[22] Filed: Oct. 11, 1977

[51] Int. Cl.[2] .............................................. F16K 1/22
[52] U.S. Cl. .................................................... 251/305
[58] Field of Search ................. 251/305, 306; 137/527, 137/527.2, 527.4, 527.8

[56] References Cited

U.S. PATENT DOCUMENTS

| | | | |
|---|---|---|---|
| 2,271,390 | 1/1942 | Dodson | 251/305 |
| 2,273,118 | 2/1942 | Langdon | 137/527.8 |
| 2,750,955 | 6/1956 | Bredtschneider et al. | 137/527.8 |
| 2,927,181 | 3/1960 | Schneider | 137/527 |
| 3,078,069 | 2/1963 | Broadbent | 251/173 |
| 3,113,593 | 12/1963 | Vicard | 251/305 |
| 3,442,489 | 5/1969 | Cary et al. | 251/305 |
| 3,485,476 | 12/1969 | Hemphill | 251/305 |
| 3,516,640 | 6/1970 | Bryer et al. | 251/305 |
| 3,677,297 | 7/1972 | Walton | 251/305 |
| 3,680,833 | 8/1972 | McNeely, Jr. | 251/305 |
| 3,770,242 | 11/1973 | O'Connor, Jr. | 251/305 |
| 3,926,215 | 12/1975 | MacLeod | 137/527.8 |
| 3,960,177 | 6/1976 | Baumann | 251/305 |

FOREIGN PATENT DOCUMENTS

| | | | |
|---|---|---|---|
| 85598 | 2/1921 | Austria | 251/305 |
| 1233654 | 5/1959 | France | 251/305 |
| 12241 | of 1905 | United Kingdom | 251/305 |
| 249019 | 3/1926 | United Kingdom | 251/305 |
| 1193426 | 6/1970 | United Kingdom. | |

OTHER PUBLICATIONS

Carl D. Wilson, "Fishtail vs Conventional Discs in Butterfly Valves," 3/1968 issue, Instruments & Control Systems.

*Primary Examiner*—William R. Cline
*Assistant Examiner*—H. Jay Spiegel
*Attorney, Agent, or Firm*—John T. O'Halloran; Peter C. Van Der Sluys

[57] ABSTRACT

A butterfly valve is provided with a high performance disc having a wedge-shaped leading half formed by a pair of flat surfaces converging towards a leading edge from a portion of maximum disc thickness positioned forward of the disc axis. The trailing half of the disc also has a pair of flat surfaces diverging from a portion of the disc adjacent the axis, thereby forming a wedge projecting into the leading half.

18 Claims, 3 Drawing Figures

U.S. Patent  Mar. 25, 1980  4,194,722
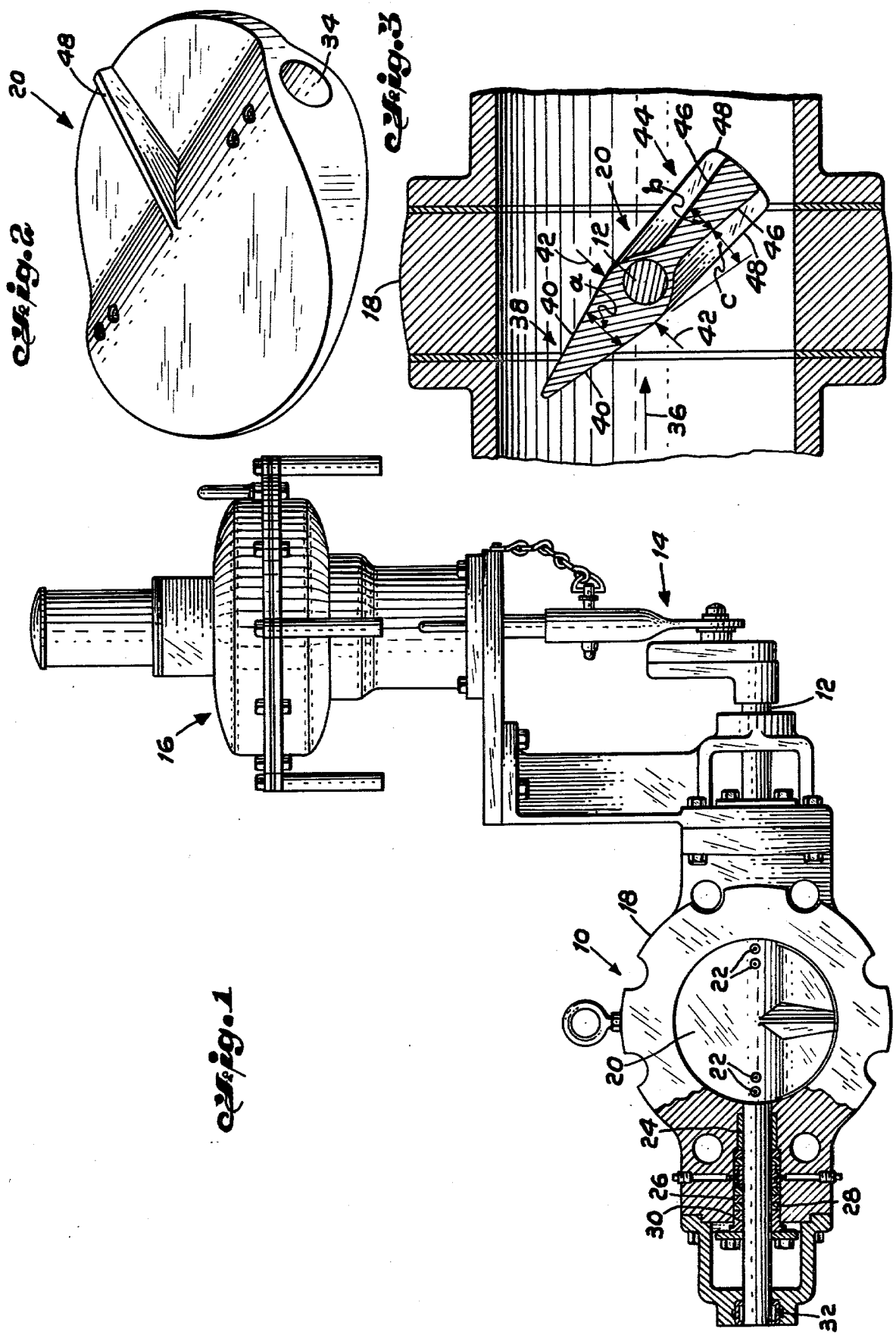

BUTTERFLY VALVE HAVING HIGH PERFORMANCE DISC

BACKGROUND OF THE INVENTION

1. Field of the Invention

The present invention relates to butterfly valves and, more particularly, to butterfly valves used for control applications.

2. Description of the Prior Art

Since their inception, butterfly valves have been used as closure-type devices for on-off control valves. In the past few decades, butterfly valves have been upgraded considerably and are rapidly gaining acceptance in the process control industry as the basic component in flow control systems. This wide acceptance of butterfly valves is primarily due to several beneficial features, such as low initial cost, space and weight savings, higher capacity than globe valves, excellent control characteristics and corrosion resistance.

Most early butterfly valve discs were formed from a flat disc-like member having two generally parallel sides. More sophisticated type valve discs were developed having surfaces tapered uniformly from an enlarged center portion to the edge portions thereof, with the shaft secured within a bore in the enlarged center portion.

The hydrodynamic forces acting on larger valve discs of the conventional configuration were generally high and therefore a relatively large actuator was required to position the valve disc and maintain stability for control operations. The velocity of the fluid flowing over the surfaces of the disc created a pressure differential between the leading and trailing halves of the disc and as a result, a considerable dynamic closing torque was exerted on the disc. The torque characteristics of the typical prior art butterfly valve disc severely limited its range of stable operation and most discs could not be operated beyond the 72° open position in throttling applications. As a result, it was necessary to utilize oversized butterfly valves in order to obtain the desired flow capacity. The need for oversized valves and the large dynamic closing torque necessitated the use of larger actuators and larger sources of activating force, such as pressurized fluid. Thus, the prior art conventional type butterfly valves when used in control applications had restricted capacity, required large actuators and had poor overall total force characteristics leading to unstable regions of operation and torque reversals at open positions of less than full capacity.

In an attempt to overcome the difficulties experienced with the conventional butterfly valve disc, many variations of "low-torque" discs have been developed. Examples of such discs are described in the following United States patents: U.S. Pat. Nos. 3,485,476; 3,516,640; and 3,770,242. Most of these discs have extended the operational range of the butterfly valve to a full 90° open position and therefore have increased the butterfly valve capacity. The so-called "low-torque" discs reduced unit "peak" dynamic unbalance and changed the "peak" position from 72° open to more than 80° open; however, for the most part this was done at the cost of capacity at intermediate positions. This resulted in a higher torque at the intermediate positions due to the higher pressure differential across the disc at these positions. As a result, most of these "low-torque" discs truly exhibited no increase in $C_v$ over conventional discs at the full open position and in some cases, it was actually lowered.

Many of the so-called "low-torque" discs used fins or flanges on the trailing edge to create a drag force to oppose the closing torque and this restricted capacity.

SUMMARY OF THE INVENTION

The present invention provides a butterfly valve having a high performance disc that sets a new standard for performance in control valves. The new valve is more than just another "low-torque" disc butterfly valve in that it has a streamline wedge shaped leading half that provides greater capacities than the prior art devices. The disc allows the butterfly valve to be used to a full 90° open position for control applications. The valve has a higher cavitation constant allowing the range of pressure differentials to be extended without introducing destructive cavitation, high noise levels or flashing.

The unique disc design reduces the peak unit dynamic unbalance to an absolute minimum and offsets the point of torque reversal and the unit dynamic unbalance characteristic as far as possible towards the full open position. By controlling the unit dynamic unbalance versus the $C_v$ characteristic from the closed position to the open position, the total installed actuator force demand curve will experience no reversal in direction, thereby assuring no loss of process control due to dynamic instability within the practical service range of the butterfly valve. Thus, the total force demand of the butterfly valve is more closely matched to the available process controllers for improved control and smaller actuator requirements which also results in less air consumption. It is clear to see that the present invention provides a more economical valve package by providing higher capacity per valve size with resultant smaller actuator requirements.

Thus, the present invention takes into consideration the "total" problem experienced by prior art butterfly valves under installed service conditions, taking into consideration the normal decay in pressure differential as the valve disc moves towards the open position. By taking into consideration all of these actual operating conditions, a truly improved high performance disc was developed.

The primary objective of the present invention is to maximize the capacity of a butterfly valve for use in control type of operations.

Another objective of the present invention is to reduce the "peak" unit dynamic unbalance to an absolute minimum.

Another objective of the present invention is to offset the point of "torque reversal" in the unit dynamic unbalance characteristics as far as possible towards the full open position.

Another objective of the present invention is to control the unit dynamic unbalance versus $C_v$ characteristic from the close position to the open position so that the total installed actuator force demand curve will experience no reversal in direction.

Another objective of the present invention is to extend the cavitation index of a butterfly valve beyond that of butterfly valves having conventional discs.

Other advantages and objectives of the present invention will become apparent from the description of the invention and the drawings which follow.

BRIEF DESCRIPTION OF THE DRAWINGS

FIG. 1 is a partial sectional view of a butterfly valve and actuator constructed in accordance with the present invention.

FIG. 2 is a perspective view showing a disc constructed in accordance with the present invention.

FIG. 3 is a cross-sectional view showing the valve disc of the present invention installed in a butterfly valve housing.

DESCRIPTION OF THE INVENTION

Referring to FIG. 1, there is shown a butterfly valve 10 having a shaft 12 connected through a linkage arrangement 14 to a valve actuator 16. The valve actuator 16 shown in FIG. 1 is a pneumatic spring and diaphragm actuator; however, it is to be understood that other types of control actuators could be used with the present invention. When using manual actuators, the advantage is that less force is required to operate the valve resulting in less effort on the part of the operator or a less expensive manual actuator. The added capacity is also important.

The butterfly valve includes a heavy wafer body 18 that may be formed of cast iron, carbon steel, stainless steel or other suitable alloys. Mounted within the butterfly valve body 18 is a disc 20 which is a self-cleaning, swing-through disc which prevents valve damage caused by dirt accumulation, said disc being formed of cast iron, carbon steel, stainless steel or other suitable alloys. The heavy-duty shaft 12 extends as one piece entirely through the valve body and disc and is journaled at both ends of the body for providing maximum support to the valve disc 20 which is fixed to the shaft by taper pins 22. The valve body is essentially symmetrical and has mounted therein inboard sleeve-type bushings 24 which assure proper shaft alignment and reduce shaft wear. The valve body is provided with deeply formed stuffing box cavities 26 which are filled with suitable packing rings 28 which are secured therein by packing followers 30 to assure a leakproof shaft seal. Outboard lubricated roller-type bearings 32 are provided for extra shaft support.

Referring to FIGS. 2 and 3, there is shown the unique configuration of the valve disc of the present invention. As in most standard butterfly valve discs, there is an enlarged center portion through which a shaft bore 34 is formed for receiving the valve shaft which is used to mount the disc in place as shown in FIG. 3 so that the disc will have a leading half 38 facing upstream and a trailing half 44 facing downstream, with the current direction being shown by arrow 36 in FIG. 3. The leading half 38 of the disc projects upstream of the shaft and has a wedge shape formed by flat sides 40 to minimize drag which results in pressure rise acting on the disc surface and tends to reduce effective flow capacity. The angle "a" between the flat sides 40 of the leading half of the disc should be the maximum possible angle consistent with the disc diameter-to-thickness ratio in order to minimize the angle of impingement ratio between leading and trailing surfaces as the disc approaches the full open position. The objective of this design is to have the forces on the trailing half cancel out most of the forces acting on the leading half.

The maximum thickness of the disc should occur at a point forward of the axial shaft as shown by lines 42 in FIG. 3. This unique positioning of the maximum disc thickness provides several advantages: (1) it tends to minimize the valve restriction to flow, thereby maximizing capacity; (2) it minimizes the amount of surface upstream of the axial shaft subject to extreme angle of flow impingement which tends to reduce the total force acting on the disc upstream of the axial shaft; and (3) it exposes the maximum amount of disc surface downstream of the shaft to flow impingement tending to maximize the total force acting on the disc downstream of the shaft, thereby canceling out the forces acting on the disc upstream of the shaft.

The trailing half 44 of the disc also has a unique wedge shape which projects into the leading half of the disc. The wedge is formed by a pair of flat surfaces 46 which diverge from a portion adjacent the shaft position. The design objective is to make an angle "b" between the surfaces 46 as nearly equal as possible to the angle "a" between the surfaces 40. Thus, the difference "c" in the angle of impingement between the leading and trailing disc halves is held to an absolute minimum without distorting the flow characteristics, thereby minimizing the difference in force acting on the two halves of the disc in the intermediate disc positions.

The disc is provided with a pair of strengthening ribs 48 formed on each side of the trailing half 44 which have the sole purpose of providing additional strength for the trailing edge of the disc.

Thus, the present invention, by providing a wedged shape leading half with flat sides, minimizes the drag to reduce the pressure acting on the disc surface. By utilizing the maximum included angle between the wedge surfaces of the leading half the angle of impingement ratio between the leading and trailing surfaces is minimized as the disc approaches the full open position. By positioning the maximum cross-sectional thickness of the disc forward of the axial shaft, the effective surface area of the leading half is reduced and the effective surface area of the trailing half is increased, to thereby provide a better ratio of leading to trailing surface areas. The use of a wedged shape trailing half reduces flow distortion and allows for the reduction in the difference of impingement angles between the leading and trailing halves to minimize the difference in forces acting on the disc.

When one considers the dynamic forces acting upon the disc, one must consider that the fluid velocity is the greatest as it passes over the trailing half of the disc and therefore less pressure is exerted on the surface of the trailing half than is exerted on the surface of the leading half where the fluid velocity is considerably lower. Thus, by controlling the relationship of the angle of impingement between the leading and trailing surfaces and by reducing the effective area of the leading surface in relationship to the effective area of the trailing surface, the most desirable unit dynamic unbalance characteristics may be achieved so that $C_v$ versus unit dynamic unbalance characteristic approaches the ideal for installed performance results.

By providing a trailing half that is wedge shaped diverging from a portion adjacent the shaft position, the present invention eliminates the need for the "fin" as shown in the previously mentioned U.S. Pat. No. 3,485,476 and the "flange" shown in U.S. Pat. No. 3,516,640. By providing the flat surfaces on the trailing edge, the disc of the present invention inherently has a higher cavitation constant ($K_m$) and therefore extends the allowable range of pressure differential without introducing destructive cavitation, noise levels or flashing.

Thus, the present invention maximizes the capacity of the butterfly valve for control applications by reducing the peak unit dynamic unbalance to an absolute minimum and offsetting the point of torque reversal as far as possible towards the full open position. By controlling the unit dynamic unbalance versus $C_v$ characteristic from the closed position to the open position, the total installed actuator force demand curve will experience no reversal in direction and there will be no loss in process control due to dynamic instability, and the required size of the actuator may be substantially reduced.

What is claimed is:

1. A disc for a butterfly valve, comprising:
   a generally circular peripheral edge;
   a shaft bore extending through the disc and having an axis extending through opposed portions of the peripheral edge;
   a leading half adapted to face upstream when the disc is inserted in a valve, said leading half including two surfaces diverging from the most leading portion of the peripheral edge towards the bore, thereby forming a wedge facing upstream; and
   a trailing half adapted to face downstream when the disc is installed in a valve, said trailing half including two diverging surfaces extending from along portions of the disc adjacent the bore towards the most trailing portion of the peripheral edge, thereby forming a wedge shape also facing upstream, wherein said disc has a maximum thickness located in the leading half forward of and adjacent to the axis of the shaft bore.

2. A disc for a butterfly valve as described in claim 1, wherein the diverging surfaces of the leading half are flat surfaces.

3. A disc for a butterfly valve as described in claim 1, wherein the diverging surfaces of the trailing half are flat surfaces.

4. A disc for a butterfly valve as described in claim 1, wherein the diverging surfaces of the leading and trailing halves are flat surfaces.

5. A disc for a butterfly valve as described in claim 1, wherein the trailing half includes a strengthening rib extending from a portion adjacent the bore to the most trailing portion of the peripheral edge.

6. In a butterfly valve disc having a generally circular peripheral edge, a shaft bore having an axis extending through opposed portions of the peripheral edge, a leading half adapted to face upstream, a trailing half adapted to face downstream, the improvement comprising, the maximum thickness of the disc being located in the leading half forward of and adjacent the axis of the shaft bore, wherein the leading half includes two flat surfaces diverging from the most leading portion of the peripheral edge towards the shaft bore, thereby forming a wedge facing upstream, and the trailing half includes two flat surfaces diverging from adjacent the shaft bore axis towards the trailing-most portion of the peripheral edge, thereby forming a wedge in the trailing half facing upstream.

7. A butterfly valve disc as described in claim 6, wherein the leading half includes two surfaces diverging from the most leading portion of the peripheral edge towards the bore, thereby forming a wedge facing upstream.

8. A butterfly valve disc as described in claim 6, wherein the trailing half includes two surfaces diverging from along portions across the disc adjacent the axis of the shaft bore towards the trailing-most portion of the peripheral edge, thereby forming a wedge facing upstream.

9. A butterfly valve, comprising:
   a valve body having a passage for the flow of fluid medium therethrough;
   a shaft rotatably mounted in said body and having an axis extending across said passage; and
   a disc having a generally circular peripheral edge, a leading half adapted to face upstream in the passage, said leading half including two surfaces diverging from the most leading portion of the peripheral edge towards the shaft axis, thereby forming a wedge facing upstream, and a trailing half adapted to face downstream in the flow passage, said trailing half including two surfaces diverging from along portions of the disc adjacent the shaft axis towards the most trailing portion of the peripheral edge, thereby forming a wedge shape also facing upstream wherein said disc has a maximum thickness located in the leading half forward of and adjacent to the shaft axis.

10. A butterfly valve as described in claim 9, wherein the diverging surfaces of the leading half of the disc are flat surfaces.

11. A butterfly valve as described in claim 9, wherein the diverging surfaces of the trailing half of the disc are flat surfaces.

12. A butterfly valve as described in claim 9, wherein the diverging surfaces of the leading and trailing halves of the disc are flat surfaces.

13. A butterfly valve as described in claim 9, wherein the trailing half of the disc includes a strengthening rib extending from a portion adjacent the shaft axis to the most trailing portion of the peripheral edge.

14. A butterfly valve as described in claim 9, additionally comprising means connected to said shaft for actuating and controlling the position of the disc.

15. A butterfly valve of the type having a valve body having a passage for the flow of fluid medium therethrough and a shaft rotatably mounted in said body along an axis extending across said passage, a valve disc having a generally circular peripheral edge mounted on said shaft and having a leading half adapted to face upstream and a trailing half adapted to face downstream, the improvement comprising, the maximum thickness of the disc being located in the leading half forward of and adjacent the axis of the shaft wherein the leading half of the disc includes two flat surfaces diverging from the most leading portion of the peripheral edge towards the shaft, thereby forming a wedge facing upstream, and the trailing half of the disc includes two flat surfaces diverging from adjacent the shaft axis towards the trailing-most portion of the peripheral edge, thereby forming a wedge in the trailing half facing upstream.

16. A butterfly valve as described in claim 15, wherein the leading half of the disc includes two surfaces diverging from the most leading portion of the peripheral edge towards the shaft, thereby forming a wedge facing upstream.

17. A butterfly valve as described in claim 15, wherein the trailing half of the disc includes two surfaces diverging from along portions across the disc adjacent the axis of the shaft towards the trailing-most portion of the peripheral edge, thereby forming a wedge facing upstream.

18. A butterfly valve as described in claim 15, additionally comprising means connected to said shaft for actuating and controlling the position of said disc.

* * * * *